United States Patent Office 3,278,142
Patented Oct. 11, 1966

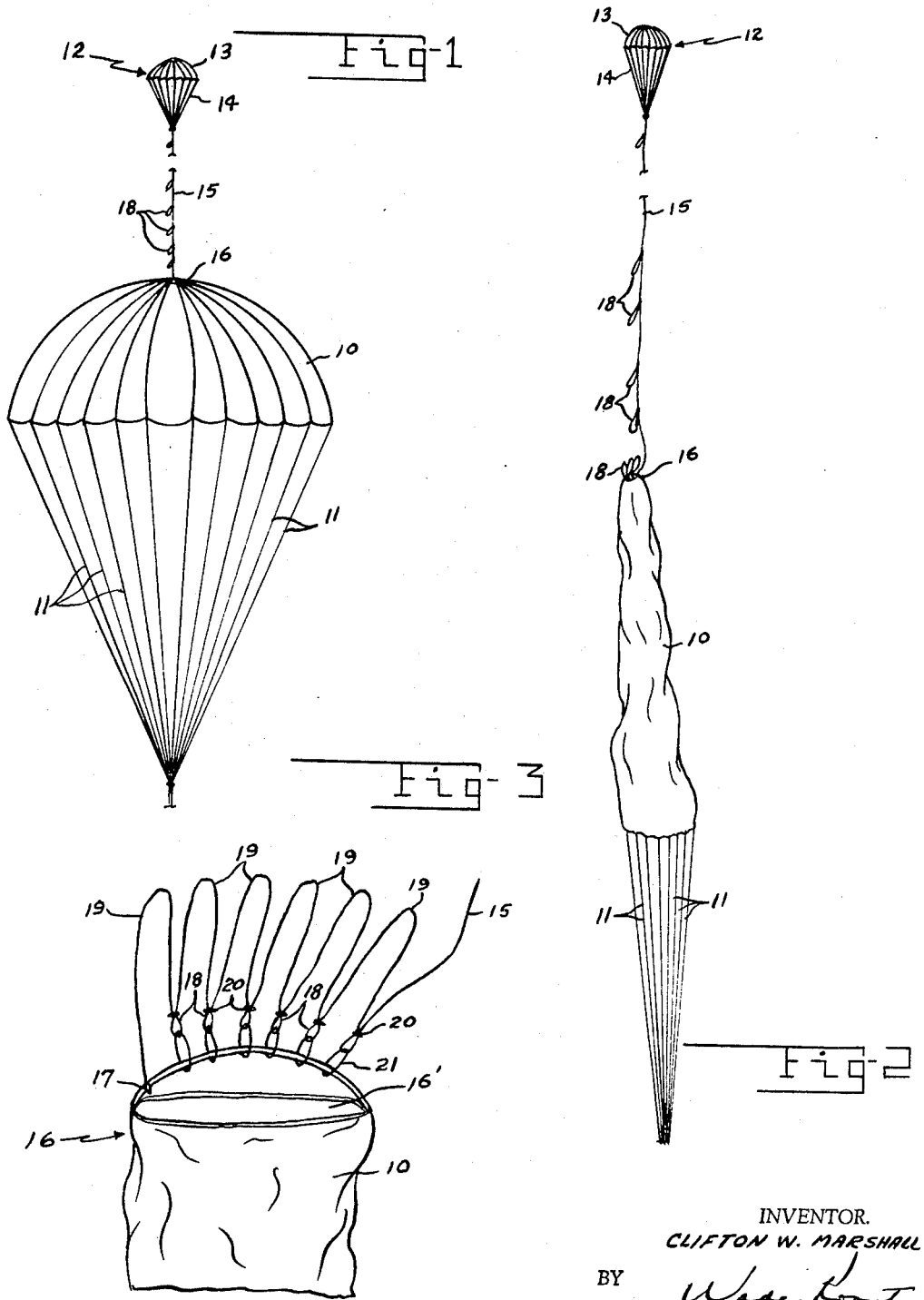

3,278,142
AUTOMATICALLY EXTENDING PILOT CHUTE BRIDLE ATTACHMENT
Clifton W. Marshall, El Centro, Calif., assignor to the United States of America as represented by the Secretary of the Air Force
Filed Sept. 29, 1964, Ser. No. 400,283
3 Claims. (Cl. 244—149)

The invention described herein may be manufactured and used by or for the United States Government for governmental purposes without the payment to me of any royalty thereon.

This invention relates generally to improvements in parachutes and, more particularly, to bridle arrangements for attaching pilot parachutes to main parachute canopies.

It has been a common or conventional practice to provide a parachute assembly with a smaller pilot parachute connected to the main larger parachute by a comparatively short flexible deployment connection or bridle, the pilot chute being connected to the apex of the main chute or canopy so that upon deployment from a parachute pack, the pilot chute will inflate quickly and help deploy the main parachute from the pack so that it may inflate more easily and positively by helping to direct the open end of the main canopy toward the wind or slip stream while extending the main parachute canopy in the direction of the slip stream. In addition, the pilot chute stabilizes the main canopy during deployment by preventing it from whipping in the wind or slip stream before it is fully inflated, thereby preventing or minimizing damage to the parachute assembly. Also the drag of the pilot chute assists in the deceleration of the parachute system before the main canopy is fully open, to substantially reduce any sudden "snatching" effect or opening force on the main canopy.

The conventional use of pilot parachutes however has not been without their problems. Prior to my invention, pilot parachutes have been conventionally attached to the apexes of the main canopies by relatively short bridles or deployment connecting lines. These short bridles were necessary to prevent the parachutist from becoming entangled in the bridle lines prior to the deployment of the main parachute canopies. However, when short bridle line attachments are utilized, the pilot chute will only function for the initial period in the main parachute opening process because when the main canopy becomes partially inflated, the pilot parachute will be blanketed by the main canopy, causing the pilot chute to collapse and become useless.

A long bridle from the apex of the main canopy to the pilot chute is very desirable and necessary to remedy this defect but this presents a hazard to the parachutist during the initial opening of the parachute pack and release of the pilot chute for deployment, as indicated above.

An object of the invention is the provision of a variable length or extensible bridle means in order to incorporate the advantageous features of the short and long bridle connections between the pilot and main parachutes, while eliminating the disadvantages thereof.

Another object of the invention is the provision of a parachute assembly having a main parachute canopy and a pilot chute for the deployment thereof which remains effective to provide appreciable drag throughout the entire deployment, and descent of the main canopy.

A still further object of the present invention is the provision of a parachute assembly, including extensible bridle cable means for increasing the effective length of the bridle and distance between the pilot chute and the main canopy incident to predetermined drag on the pilot chute during deployment, which does not increase maintenance or production costs, yet overcomes the disadvantages of the initially long or short bridles in a simple, effective and inexpensive manner.

A further object of the invention is the provision of a pack deployable parachute assembly comprising a main parachute canopy and a relatively long bridle connection therefrom to a pilot chute including retaining means for releasably confining the bridle in predetermined conventional close coupled relation to the main canopy, and is progressively extensible to its maximum length by predetermined pull or drag of the pilot chute thereon during deployment, to maintain the bridle substantially under tension during complete deployment and descent of the main canopy.

Other objects and advantages of the invention will become apparent from the following description and accompanying drawings in which like reference characters refer to like parts in the several figures.

FIG. 1 is a somewhat schematic side elevation of a parachute assembly incorporating the invention, wherein the pilot chute and the main parachute canopy are shown in completely inflated condition, and employing a much longer deployment or bridle connection than the conventional bridle, parts of the bridle being broken away to foreshorten the length thereof, as illustrated.

FIG. 2 is a schematic side view, illustrating the parachute assembly of the present invention in the initial deployment stage wherein the pilot chute is deployed and the extensible bridle cable is partly extended, part of the bridle cable being also broken away and foreshortened, and;

FIG. 3 is an enlarged somewhat schematic detailed fragmentary view of the apex area of the main parachute canopy, prior to full deployment, showing one method or embodiment by which the bridle cable means from the pilot chute is attached to the canopy for progressive extension of the effective length of the deployment bridle cable during deployment of the main canopy.

The nature of the parachute assembly of the present invention may be stated in general terms as including a main parachute canopy having shroud lines attached to the skirt portion thereof, with the shroud lines converging downwardly to means adapted to support a load, a small pilot chute having shroud lines, a long bridle cable, one end of which is attached to the pilot chute shroud lines and the other end attached to the main canopy, frangible means or break cords being provided between the apex of the canopy and successive loops formed in the length of the bridle, whereby the bridle is automatically extendable in length during deployment of the main parachute canopy by drag forces applied by the pilot chute progressively severing the frangible means, whereby to permit the pilot chute to remain operative to provide appreciable drag during complete deployment and descent of the main canopy to impose the drag forces thereof on the main canopy, even after full deployment of the main canopy.

Referring to the drawings, a main conventional parachute canopy is indicated generally at 10, having conventional shroud lines attached thereto which converge together at their lower ends and are connected to support a load to be suspended and lowered by the parachute. The parachute assembly also includes a somewhat conventional pilot parachute 12 which comprises a canopy 13 having shroud lines 14 converging downwardly therefrom to a common center to which is attached an elongated bridle cable indicated generally at 15 with the other or lower end thereof attached to the apex area of the main parachute canopy 10.

According to the present invention the elongated bridle or deployment cable is extendable upon predetermined pull or drag force on the bridle cable by the pilot chute during deployment of the parachute assembly to automatically increase the effective length of the bridle cable to increase the distance between the main canopy and the pilot chute as the assembly deploys. This may be more easily understood with particular reference to FIG. 3 of the drawings in which one method of attachment of the bridle 15 to the apex area 16 of the canopy is shown in particular detail.

The bridle 15 is attached at one end thereof to the apex area 16 of the main parachute canopy 10 by a bail-like cord, or cable, or curved bar 17 extending across the apex vent 16', and may be accomplished by any method such as by securely tying longitudinally spaced points in the length of the bridle cable 15 to the member 17.

According to the invention as shown, a series or plurality of spaced loops 18 are formed along the length of the bridle or load line 15. The loops 18 can be formed by any of several methods, the method illustrated in the drawings consisting of gathering sufficient lengths of the bridle or cable material 15 to form a progressive series of large loops 19, and then tying the mouths of the adjacent loop 19 together by suitable material 20 to form the small loops 18, with the break cords or loops 21 of predetermined break strength extending around the main connector bar or attachment 17 and through the loops 18, as shown in FIG. 3.

An alternate method of forming the successive loops 18 in the bridle 15 would be to form them as an integral part of the bridle when the bridle is fabricated.

The loops 18 may be secured to the apex bar or cable 17 by frangible ring members 21 which will break upon application of a predetermined force or pull on the upper end of the bridle cable by the pilot chute. The other extremity of the bridle 15 should, of course, be securely attached to the cross bar or cable attachment 17 so that when the deployment bridle 15 is fully extended, as shown in FIG. 1, the pilot chute is directly connected to the apex of the main canopy but at a remote distance from or above the main canopy so as to be substantially out of the "back draft" and turbulence area above the main canopy during descent thereof.

In this manner, the effective length of the bridle 15 at the time of initial deployment may be automatically extended during deployment of the parachute assembly by the exertion of predetermined force by the pilot chute sufficient to break each of the frangible members 21.

The effective length of the bridle 15 will remain short, substantially like the conventional bridle, during the placing of the parachute assembly in the deployment pack (not shown) and during the beginning of the initial deployment of the parachute, and will then be progressively automatically extended by the drag of the pilot chute, to its full length, thus alleviating any problems of the danger of having personnel using the parachute from being entangled in the bridle attachment when the pilot chute is released from the pack and the bridle line is slack. Likewise, by providing an automatically extendable bridle attachment having an initially short effective length, the pilot chute's effectiveness will not be lost but will be increased over the conventional pilot chute attachments since the drag of the pilot chute will remain effective during the entire descent of the main canopy as well as throughout the entire deployment process.

Other methods of attachment for controlling the automatic extension of the bridle 15 may be provided without departing from the true spirit and scope of the present invention. For example, the bridle 15 may be coiled, with each loop of the coil attached to the successive or adjacent loop of the coil by frangible material 21, or break cords of predetermined strength, to accomplish substantially the same advantageous results contemplated.

It is understood and desirable that the predetermined break strength of the frangible material or break cords 21 is sufficient to permit partial deployment or extension of the main canopy in the direction of the slip stream before the frangible means progressively break to cause the automatic extension of the extensible bridle or deployment cable means.

In the foregoing description, certain terms have been used for purposes of clearness and understanding, but no unnecessary limitations are to be implied therefrom beyond the requirements of the prior art, if any, because such words are used for descriptive purposes and are intended to be construed as broad as possible. Therefore, it is to be understood that the invention is not to be limited to the specific embodiments herein shown and described but may be carried out in other ways without departure from the spirit and scope of the invention as defined by the following claims.

I claim:

1. In a parachute deployment system, a main parachute canopy having an apex portion, a pilot parachute for deploying the main parachute canopy and providing additional predetermined drag on the main canopy during complete deployment and descent thereof, a substantially long main canopy deployment cable connected at one end to said pilot parachute and at its opposite end to the apex portion of the main parachute canopy having sufficient predetermined length to position the pilot parachute at a sufficient distance above the main parachute canopy following deployment and during descent thereof to prevent blanketing of the slip stream and reduce excessive turbulence on the pilot parachute by the main parachute canopy, said deployment cable having a plurality of spaced loop portions in the length thereof, and frangible means having predetermined break strength successively connecting each of said loop portions to the apex portion of the main canopy to initially shorten the effective length of said cable means to initially dispose the pilot chute in closer proximity to the apex portion of the main canopy during initial deployment to eliminate excessive slack in the cable between the pilot and main parachute canopies during said initial deployment, and frangible means being breakable by predetermined drag of the slip stream on the pilot chute during the deployment of the main canopy to progressively extend the effective length of the cable means to said predetermined length with said pilot parachute disposed in the slip stream above the main canopy to provide additional drag on the main canopy during descent thereof.

2. In a parachute deployment system, a main parachute canopy, a pilot chute for deploying the main canopy and providing additional drag during descent of the main canopy, a relatively long deployment cable connected at one end to said pilot chute, said main canopy having an apex portion, a bail-like supporting connector fixed to said apex portion, said cable attached at its other end to said bail-like supporting connector for connecting said pilot chute to said main canopy, said deployment cable having a sufficient predetermined length to separate the pilot chute from the main canopy a sufficient distance to prevent the blanketing of the pilot chute by the main canopy during descent and provide additional drag of the pilot chute on the main canopy during the descent of the canopies following deployment, said cable having a plurality of longitudinally spaced loops formed between the ends thereof, break cord means connecting the ends of the loops to said bail-like supporting connector prior to deployment of the main canopy to materially reduce the effective length of the deployment cable between the pilot and main canopies to take out the excessive slack in the cable before and during preliminary deployment, said break cord means having a predetermined break strength resistance to drag of the pilot parachute, whereby greater drag of said pilot parachute in the slip stream during deployment progressively breaks said break cord means to extend said cable to its maximum length during deployment of said main canopy.

3. In a parachute deployment system, a main conventional parachute canopy having an apex vent, a conventional pilot parachute, a long deployment line connected between the main canopy adjacent the apex vent and the pilot parachute having sufficient predetermined length therein when extended to dispose the pilot chute in the slip stream a sufficient predetermined distance above the main canopy to eliminate the possibility of said pilot chute being blanketed by the main canopy, and deployment line confining and foreshortening means operable on said line between the opposite ends thereof for initially shortening the effective length of said line to substantially the length of a conventional deployment line between a conventional parachute and its conventional pilot deployment chute, for eliminating any excessive slack in the line between the main and pilot canopies during deployment of the main canopy, and release means for said confining means responsive to predetermined drag of the pilot chute on the line in excess of the initial drag necessary for initial deployment of the main canopy, whereby to progressively extend the effective length of the line to its maximum length, whereby the drag of the pilot chute remains effective on the main canopy through the descent of the main canopy, as well as during the deployment thereof, in which said deployment line confining means comprises a plurality of loops connected in the line in spaced relation to each other between the ends of the line, and frangible break cord means successively connecting the ends of the loops to the main canopy adjacent the apex vent therein, said break cord means having sufficient resistance to fracture during preliminary drag of the pilot parachute during initial deployment of the main canopy into the slip stream by the pilot parachute and frangible by additional drag of the pilot chute in the slip stream following full extension of the main canopy in the slip stream.

References Cited by the Examiner
UNITED STATES PATENTS

| | | | |
|---|---|---|---|
| 1,947,468 | 2/1934 | Gibson | 244—147 |
| 2,267,791 | 12/1941 | Finlayson et al. | 244—142 |
| 2,978,212 | 4/1961 | Istel et al. | 244—148 |

MILTON BUCHLER, *Primary Examiner.*

ALFRED E. CORRIGAN, *Examiner.*